(12) United States Patent
Nilsson et al.

(10) Patent No.: US 10,952,236 B2
(45) Date of Patent: Mar. 16, 2021

(54) BEAM SELECTION SYSTEMS AND METHODS

(71) Applicant: Telefonaktiebolaget LM Ericsson (publ), Stockholm (SE)

(72) Inventors: Andreas Nilsson, Gothenburg (SE); Fredrik Athley, Kullavik (SE); Sven Petersson, Sävedalen (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/409,076

(22) Filed: May 10, 2019

(65) Prior Publication Data

US 2020/0359404 A1 Nov. 12, 2020

(51) Int. Cl.
*H04W 72/12* (2009.01)
*H04L 5/00* (2006.01)
*H04W 24/08* (2009.01)
*H04W 72/04* (2009.01)
*H04W 72/02* (2009.01)

(52) U.S. Cl.
CPC ....... *H04W 72/1289* (2013.01); *H04L 5/0053* (2013.01); *H04W 24/08* (2013.01); *H04W 72/046* (2013.01); *H04W 72/1231* (2013.01); *H04W 72/02* (2013.01)

(58) Field of Classification Search
CPC . H04W 72/00; H04W 72/02; H04W 72/1289; H04W 72/1226; H04W 24/08; H04W 28/00; H04W 28/0205; H04L 5/0053
See application file for complete search history.

(56) References Cited

U.S. PATENT DOCUMENTS

| | | | | |
|---|---|---|---|---|
| 10,448,403 | B2* | 10/2019 | Takano | H04W 72/0413 |
| 2009/0086690 | A1* | 4/2009 | Gu | H04B 7/0417 370/338 |
| 2013/0072243 | A1* | 3/2013 | Yu | H04B 7/088 455/509 |
| 2014/0323143 | A1* | 10/2014 | Jung | H04L 5/0025 455/452.1 |
| 2015/0236772 | A1* | 8/2015 | Hammarwall | H04L 5/0048 370/329 |
| 2016/0119910 | A1* | 4/2016 | Krzymien | H04L 5/0023 370/329 |

(Continued)

OTHER PUBLICATIONS

International Search Report issued in International Application No. PCT/EP2019/063691, dated Dec. 5, 2019 (4 pages).

(Continued)

*Primary Examiner* — Warner Wong
(74) *Attorney, Agent, or Firm* — Rothwell, Figg, Ernst & Manbeck, P.C.

(57) ABSTRACT

During a first P3 sweep that is associated with a first TCI state and during a second P3 sweep that is associated with a second TCI state, the UE stores the RSRP for each UE RX beam for each UE panel. Then, when the UE is scheduled for a downlink transmission through a DCI pointing to two these two TCI states, instead of only selecting the UE RX beam for respective panel based on the highest RSRP, the UE also takes the hypothetical inter-stream interference in to account when selecting the UE RX beams.

23 Claims, 17 Drawing Sheets

(56) References Cited

U.S. PATENT DOCUMENTS

| | | | |
|---|---|---|---|
| 2016/0197660 A1* | 7/2016 | O'Keeffe | H04W 16/28 |
| | | | 370/329 |
| 2017/0230869 A1* | 8/2017 | Kubota | H04L 5/0048 |
| 2018/0048360 A1* | 2/2018 | Athley | H04W 8/082 |
| 2018/0220403 A1* | 8/2018 | John Wilson | H04W 72/0406 |
| 2018/0241494 A1* | 8/2018 | Chendamarai Kannan | |
| | | | H04J 11/0073 |
| 2018/0242300 A1* | 8/2018 | Hakola | H04W 72/046 |
| 2018/0263024 A1* | 9/2018 | John Wilson | H04L 5/005 |
| 2018/0331739 A1 | 11/2018 | Nilsson | |
| 2018/0351627 A1* | 12/2018 | Nilsson | H04B 7/088 |
| 2018/0351630 A1 | 12/2018 | Nilsson et al. | |
| 2019/0124639 A1* | 4/2019 | Nilsson | H04W 72/046 |
| 2019/0173533 A1* | 6/2019 | Kim | H04W 76/27 |
| 2019/0342872 A1* | 11/2019 | Rune | H04L 5/0091 |
| 2019/0349062 A1* | 11/2019 | Zhang | H04W 76/11 |
| 2020/0007221 A1* | 1/2020 | Nilsson | H04B 7/0695 |

OTHER PUBLICATIONS

Written Opinion of the International Searching Authority issued in International Application No. PCT/EP2019/063691, dated Dec. 5, 2019 (9 pages).

* cited by examiner

P3_1 (TRP B1)
- UE B1: -130 dBm
- UE B2: -80 dBm
- UE B3: -160 dBm
- UE B4: -85 dBm
- UE B5: -70 dBm
- UE B6: -80 dBm

P3_2 (TRP B2)
- UE B1: -80 dBm
- UE B2: -75 dBm
- UE B3: -80 dBm
- UE B4: -125 dBm
- UE B5: -120 dBm
- UE B6: -130 dBm

BEAM SELECTION SYSTEMS AND METHODS

TECHNICAL FIELD

Disclosed are embodiments related to selecting UE beams for use in receiving a transmission from a transmit/receive point (TRP).

BACKGROUND

Narrow beam transmission and reception schemes are typically needed at higher frequencies to compensate for high propagation loss. For a given communication link, a beam can be applied at both the transmit/receive point (TRP) (i.e., an access point, such as a base station, or a component of an access point that comprises an antenna arrangement and a radio unit) and a user equipment (UE) (i.e., a communication device, such a smartphone, sensor, appliance, table, etc., capable of wireless communication with a TRP). The pair of beams consisting of the beam applied at the TRP and the beam applied by the UE is referred to as a "beam pair link (BPL)" in this disclosure.

Referring to FIG. 1, a beam management procedure is employed to discover and maintain a TRP 104 beam 112 (e.g., a TRP transmit (TX) beam) and/or a UE 102 beam 116 (e.g., a UE receive (RX) beam). In the example of FIG. 1, one BPL has been discovered (i.e., the beam pair that consists of TRP beam 112 and UE beam 116) and is being maintained by the network. A BPL is expected to mainly be discovered and monitored by the network using measurements on downlink (DL) reference signals (RSs) used for beam management, e.g., a CSI-RS (channel-state-information RS) or SSB (Synchronization Signal Block). The CSI-RSs for beam management can be transmitted periodically, semi-persistently or aperiodic (event triggered) and they can be either shared between multiple UEs or be UE-specific. In order to find a suitable TRP TX beam the TRP 104 transmits CSI-RS in different TRP TX beams on which the UE 102 performs RSRP measurements and reports back the N best TRP TX beams (where N can be configured by the network). Furthermore, the CSI-RS transmission on a given TRP TX beam can be repeated to allow the UE to evaluate suitable UE beam (UE RX beam training).

It has been agreed in 3GPP that CSI-RS resources used for beam management can consist of one or two CSI-RS ports. If the TRP has dual-polarized antennas (for example a panel as illustrated in FIG. 2A), one possible working assumption in New Radio (NR) for beam management is to configure each CSI-RS resource with two ports, one port per polarization, i.e. each TRP TX beam is transmitted over two polarizations. In this case the UE can measure an average RSRP over both polarizations and report back the best TRP TX beam(s).

There are basically three different implementations of beamforming, both at the TRP and at the UE: 1) analog beamforming, 2) digital beamforming, and 3) hybrid beamforming. Each implementation has its pros and cons. Digital beamforming is the most flexible solution but also the costliest due to the large number of required radios and baseband chains. Analog beamforming is the least flexible but cheaper to manufacture due to reduced number of radio and baseband chains. Hybrid beamforming is a compromise between the analog and digital beamforming. One type of beamforming antenna architecture that has been agreed to study in 3GPP for the New Radio (NR) access technology is the concept of antenna panels, both at the TRP and at the UE.

An antenna panel (or "panel" for short) is an antenna array of single-polarized or dual-polarized antenna elements with typically one transmit/receive unit (TX/RU) per polarization. An analog distribution network with phase shifters is used to steer the beam of each panel. FIG. 2A illustrates an example of a two-dimensional dual-polarized panel and FIG. 2B illustrates an example of a one-dimensional dual-polarized panel, where each panel is connected to one TXRU per polarization.

P2 and P3 Beam Sweeps

It is expected that the determination of a BPL between TRP 104 and UE 102 (i.e. finding a suitable TRP beam and UE beam) starts with a P2 beam sweep (after a potential coarse estimated direction has been found from a P1 sweep, for example based on SSB during initial access). A P2 beam sweep is illustrated in FIG. 3A. A P2 beam sweep is a process that includes the TRP 104 transmitting CSI-RS in different TRP TX directional beams 303 and the UE 102 measuring RSRP for each of the directional beams (or "beams" for short) in the set of TRP beams 303 (using a fixed UE RX beam 301) and sending back to the TRP 104 the CSI-RS resource index(s) (CRI(s)) corresponding to the highest RSRP(s), where each CRI corresponds to one of the TRP TX beams 303. During such P2 beam sweep it is expected that, for each UE antenna panel, UE 102 will apply a wide beam 301 (a.k.a., a non-directional beam or omnidirectional beam) (e.g. the widest beam that the UE is able to generate) so that as many propagation paths as possible between the TRP 104 and the UE 102 are captured by the P2 beam sweep. Following the P2 beam sweep, the TRP is expected to do a P3 beam sweep, which is illustrated in FIG. 3B. A P3 beam sweep is a process that includes the TRP 104 transmitting a burst of CSI-RS in (typically) the best reported TRP TX directional beam from the P2 procedure (which in this example is TRP TX beam 312), which means that the UE 102 can sweep through different UE RX directional beams 305, perform measurements on the CSI-RS and select a preferred UE RX directional beam (e.g., UE RX beam 314). How the UE determine the candidate UE RX beams is up to UE implementation.

It is expected that a UE will use two or more panels, preferably pointing in different directions, in order to improve the coverage and increase the order of spatial multiplexing. One example of such implementation is illustrated in FIG. 4, where two one-dimensional panels are located in different directions at a UE 402. The antenna elements (or panels) can be either dual-polarized or single-polarized.

For high-gain beamforming, each beam is only optimal within a small area, and the link budget outside the optimal beam deteriorates quickly. Hence, frequent and fast beam switching may be needed to maintain high performance. To support such beam switching, a beam indication framework has been specified in NR. For example, for downlink data transmission (i.e., a transmission on the Physical Downlink Shared Channel (PDSCH)), the downlink control information (DCI) contains a pointer to a transmission configuration indicator (TCI) that informs the UE which TRP TX beam will be used so that the UE can adjust its RX accordingly. This is beneficial for the case of analog RX beamforming where the UE needs to determine and apply the RX beamforming weights before it can receive the PDSCH.

In case a TRP 504 would like to use two TRP beams pointing in different directions to transmit data to a UE 502 (see FIG. 5), or if two TRPs located at different positions should transmit to one UE simultaneously (i.e. simultaneous multi-TRP transmission), the UE might need to receive data from two different directions, as shown in FIG. 5, for a single TRP 502 with two panels. To handle this, it has been agreed in Rel-16 that a single DCI message can contain a pointer indicating two different TCI states, and hence indicating two different TRP TX beams.

SUMMARY

Certain challenges exist. For example, for a conventional P3 beam sweep, the UE will determine one UE RX beam (per UE panel), which then can be associated with a TCI state (enabled by using the CSI-RS in a P3 beam sweep as the spatial QCL source reference signal for a certain TCI state). This means that one UE RX beam is determined per UE panel, typically based on the beam associated with the highest RSRP. However, when the network communicates with the UE more than one beam (e.g., a TRP has two panels as shown in FIG. 5 or two TRPs communicate with the UE at the same time), this might be sub-optimal with respect to maximizing the user throughput due to significant inter-stream interference in case of higher layer spatial multiplexing.

To overcome this problem, in one embodiment, during a first P3 sweep (P3_1) that is associated with a first TCI state and during a second P3 sweep (P3_2) that is associated with a second TCI state, the UE stores the RSRP for each UE RX beam for each UE panel. Then, when the UE is scheduled for a downlink (DL) transmission through a DCI pointing to two these two TCI states, instead of only selecting the UE RX beam for respective panel based on the highest RSRP, the UE also takes the hypothetical inter-stream interference in to account when selecting the UE RX beams (which is possible because the RSRP values have been stored for each UE RX beam for each UE panel for each of the two TCI states). The advantage of this is that the UE can select UE RX beams taking inter-stream interference in to account which could increase the user throughput.

Accordingly, in one aspect there is provided a method performed by a UE. In one embodiment the method includes the UE producing a first power value based on a reception of a reference signal (RS) transmitted using a first TRP beam and received using a first UE beam and a first antenna arrangement of the UE and producing a second power value based on a reception of an RS transmitted using a second TRP beam and received using the first UE beam and the first antenna arrangement. The method also includes the UE receiving downlink control information (DCI) for scheduling a transmission of data to the UE, the DCI comprising information with which the first and second power values are associated. The method also includes the UE, after receiving the DCI, retrieving the first and second power values using the information in the DCI. The method also includes the UE calculating a first value using as inputs to the calculation the first and second power values. And the method also includes the UE using the calculated first value in a process for selecting UE beams to use to receive the scheduled transmission of data.

In another aspect computer instructions are provided, which computer instructions when performed by processing circuitry of the UE causes the UE to perform the above described method. In some embodiments, the computer instructions are stored on a non-transitory computer readable medium.

In another aspect there is provided a UE that is adapted to perform the above described method.

In some embodiments, the RS that was transmitted using the first TX beam is one of a burst of RSs transmitted to the UE using the first TX beam as part of a beam management procedure, and the RS that was transmitted using the second TX beam is one of a burst of RSs transmitted to the UE using the second TX beam as part of said beam management procedure.

In some embodiments, the method further includes, prior to receiving the DCI, the UE performs the steps of: producing a third power value based on a reception of a RS transmitted using the first TRP beam and received using a second UE beam and a second antenna arrangement of the UE; and producing a fourth power value based on a reception of an RS transmitted using the second TRP beam and received using the second UE beam and the second antenna arrangement. In some embodiments, the method further includes, after receiving the DCI, the UE performing the further steps of: retrieving the third and fourth power values using the information in the DCI; calculating a second value using as inputs to the calculation the third and fourth power values; and using the calculated first and second values in the process for selecting UE beams to use to receive the scheduled transmission of data. In some embodiments, using the calculated first and second values in the process for selecting UE beams to use to receive the scheduled transmission of data comprises the UE calculating a first throughput value (TP1), were TP1=T1+T2, T1 is the first calculated value, T2 is the second calculated value, T1 is a function of a difference between the first power value and the second power value, and T2 is a function of a difference between the third power value and the fourth power value. In some embodiments, T1=10*log 2(P_TRP_B2_UE_B1-P_TRP_B1_UE_B1-N), T2=10*log 2(P_TRP_B1_UE_B2-P_TRP_B2_UE_B2-N), P_TRP_B1_UE_B1 is the first power value, P_TRP_B2_UE_B1 is the second power value, P_TRP_B1_UE_B2 is the third power value, P_TRP_B2_UE_B2 is the fourth power value, and N is a noise value.

In some embodiments the method further includes, prior to receiving the DCI, the UE performs the steps of: producing a fifth power value based on a reception of a RS transmitted using the first TRP beam and received using a third UE beam and the first antenna arrangement of the UE; and producing a sixth power value based on a reception of an RS transmitted using the second TRP beam and received using the third UE beam and the first antenna arrangement. In some embodiments the method further includes after receiving the DCI, the UE performs the further steps of: retrieving the fifth and sixth power values using the information in the DCI; calculating a third value using as inputs to the calculation the fifth and sixth power values; and using the calculated first, second, and third values in the process for selecting UE beams to use to receive the scheduled transmission of data. In some embodiments, using the calculated first, second, and third values in the process for selecting UE beams to use to receive the scheduled transmission of data comprises: calculating a first throughput value (TP1), where TP1=T1+T2; calculating a second throughput value (TP2), where TP2=T3+T2; determining whether TP1 is larger than TP2; and as a result of determining that TP1 is larger than TP2, selecting the first beam and the second beam to receive the scheduled transmission of data, wherein T1 is the first calculated value, T2 is the second calculated value, and T3 is the third calculated value. In some embodiments, T1 is a function of a difference between the first power value and the second power value, T2 is a function of a difference between the third power value and the fourth power value, and T3 is a function of a difference between the fifth power value and the sixth power value.

In some embodiments, the method further includes the UE storing the first power value so that the first power value is associated with information associated with the first TRP beam and the UE storing the second power value so that the second power value is associated with information associated with the second TRP beam.

In some embodiments, the RS signal transmitted using the second TRP beam is transmitted from the same TRP that transmits the RS signal transmitted using the first TRP beam.

BRIEF DESCRIPTION OF THE DRAWINGS

The accompanying drawings, which are incorporated herein and form part of the specification, illustrate various embodiments.

DETAILED DESCRIPTION

Figure 1:
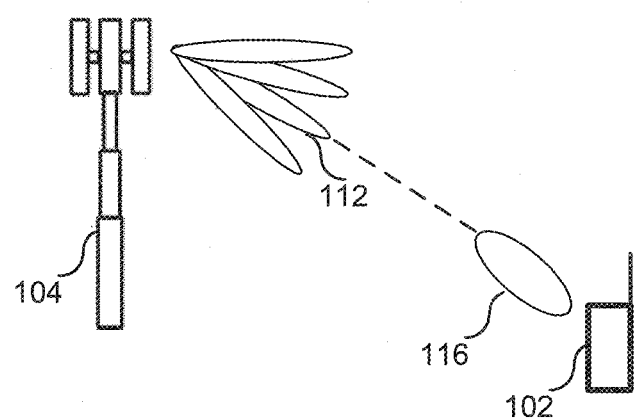
FIG. 1 illustrates a beam pair link (BPL).
Figure 2A:
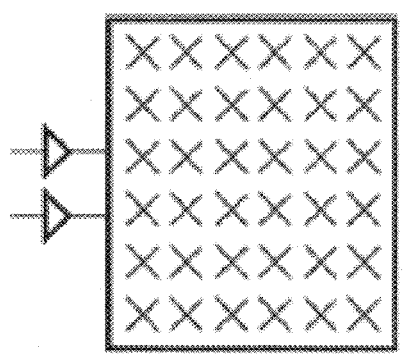
FIG. 2A illustrates an example of a two-dimensional dual-polarized panel.
Figure 2B:
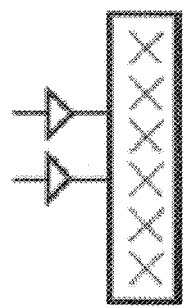
FIG. 2B illustrates an example of a one-dimensional dual-polarized panel.
Figure 3A:
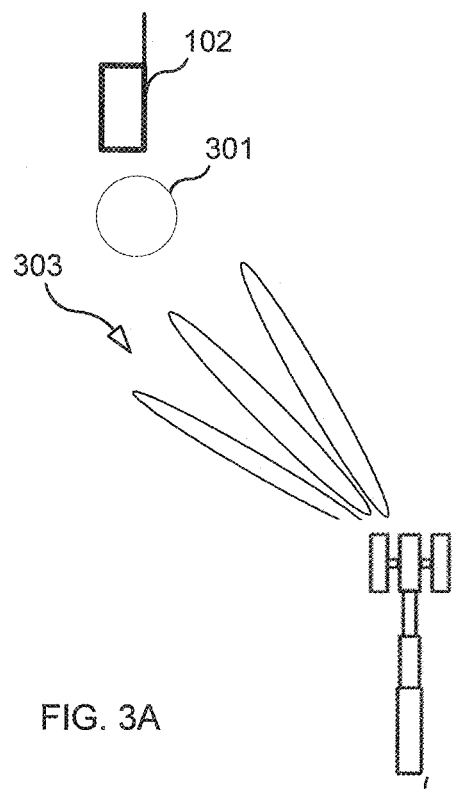
FIG. 3A illustrates a P2 beam sweep.
Figure 3B:
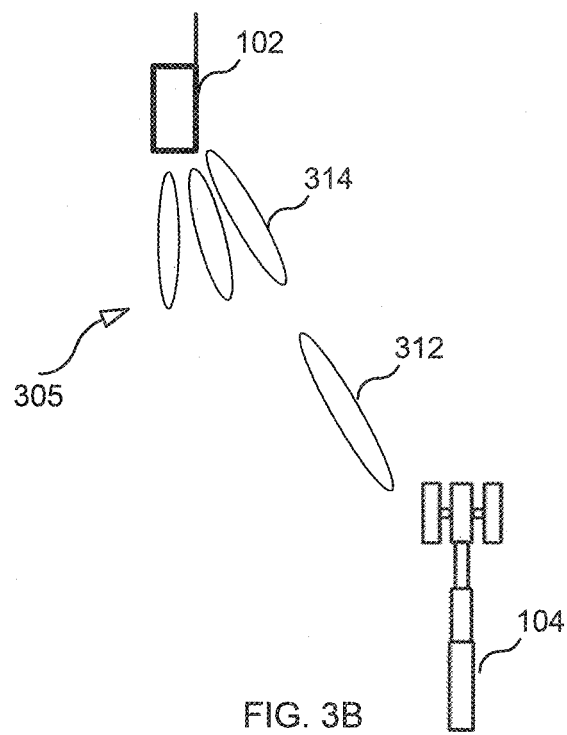
FIG. 3B illustrates a P3 beam sweep.
Figure 4:
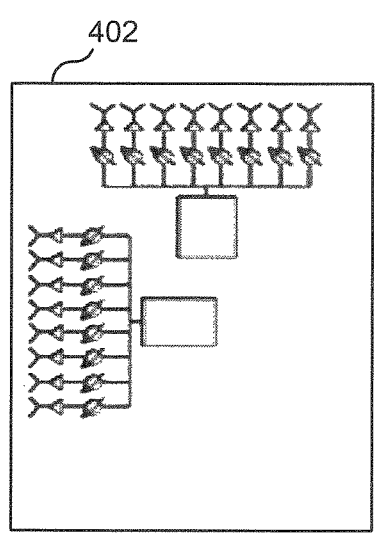
FIG. 4 illustrates a UE with two antenna arrangements.
Figure 5:
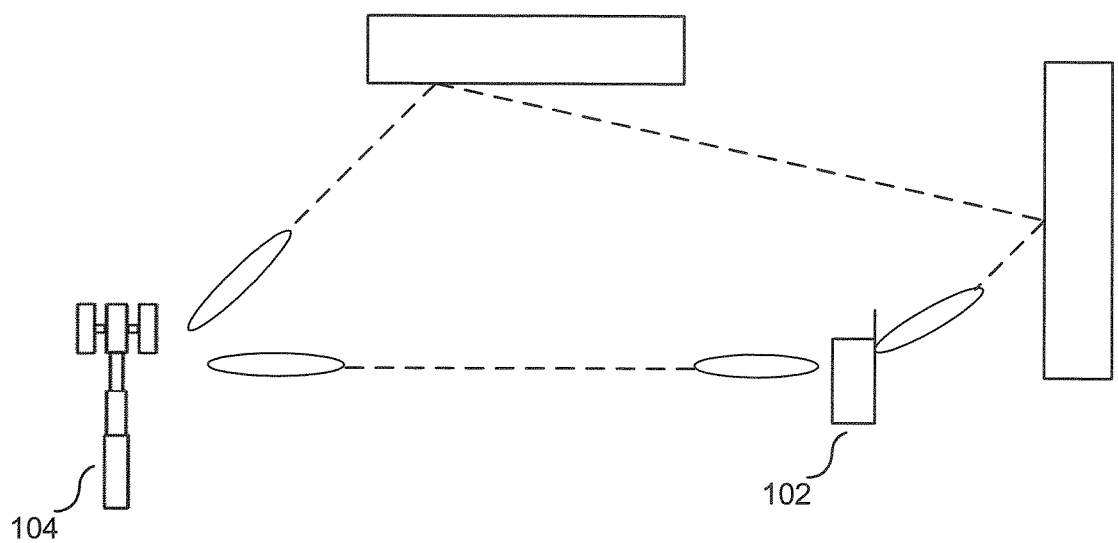
FIG. 5 illustrates a TRP using two beams to transmit data to a UE.
Figure 6:
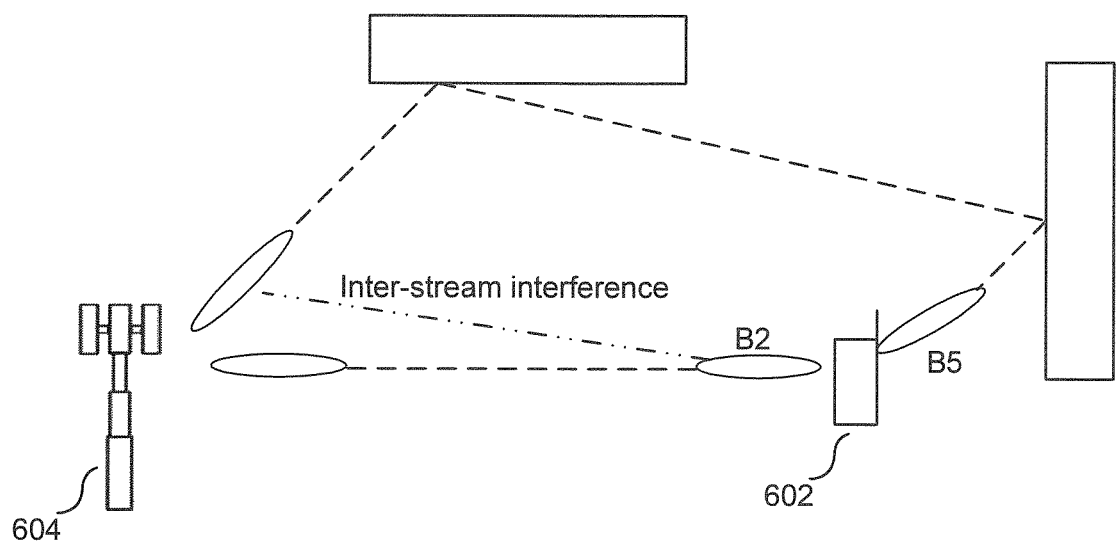
FIG. 6 illustrates an example of inter-stream interference.

FIG. 6. illustrates inter-stream interference. If, as a result of performing two P3 sweeps, the UE 602 selects to use UE beams b2 and b5 to receive data transmitted by TRP 604 using beams TRP b1 and TRP b2 because UE beams b2 and b5 produced the highest RSRP values, the downlink throughput may be negatively impacted due to the inter-stream interference experienced by the UE. To overcome this, the UE should take this inter-stream interference into account when selecting which UE beams to use to receive the DL transmission.

Figure 7:
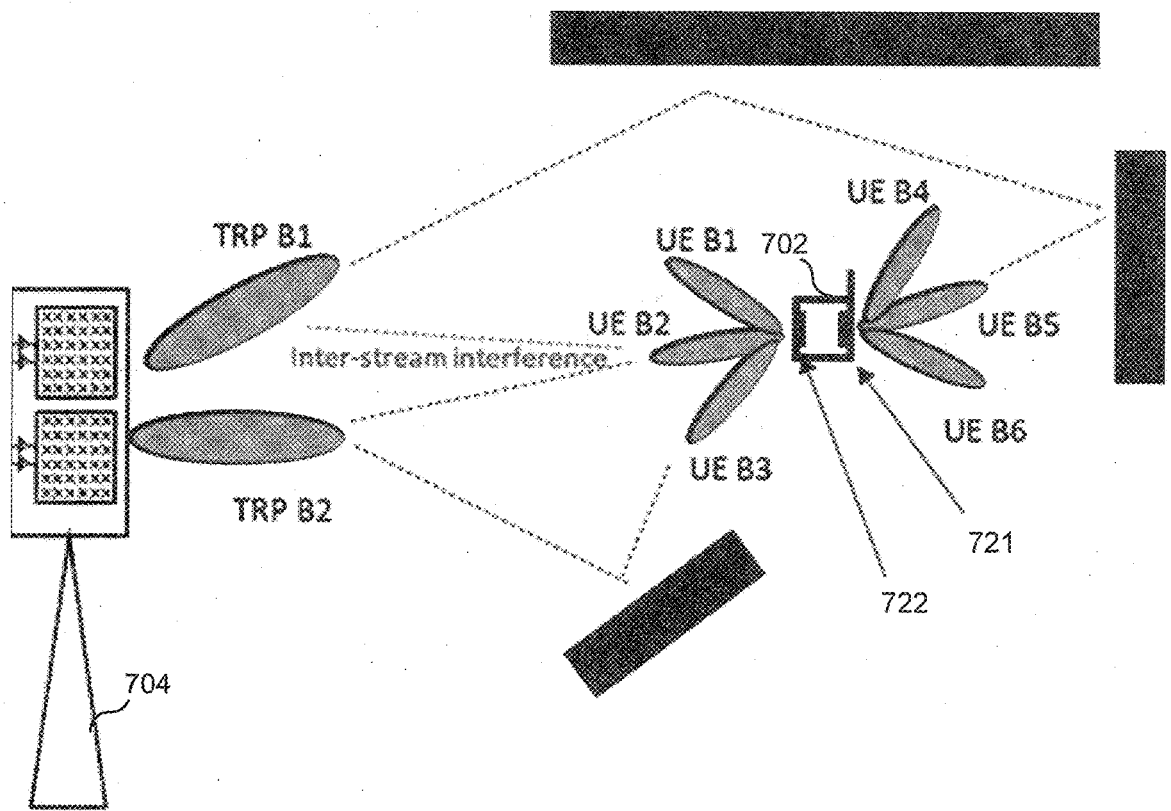
FIG. 7 illustrates a beam management procedure according to an embodiment.

FIG. 7 illustrates an embodiment. The TRP 704 triggers the UE 702 to perform two P3 sweep (P3_1 and P3_2), one for TRP beam TRP B1 and one for TRP B2. While FIG. 7 shows a single TRP 704 using TRP B1 and TRP B2, it is contemplated one TRP may one TRP beam to perform the first P3 sweep and another TRP may use a second TRP beam to perform the other sweep. For each P3 beam sweep and for each UE antenna arrangement 721, 722 (e.g., panel) the UE will sweep through the candidate UE RX beams for the antenna arrangement 721, 722. The corresponding RSRP values for each of the two P3 sweeps can be found in the table below.

|  | P3_1 (TRP B1) | P3_2 (TRP B2) |
| --- | --- | --- |
| UE B1 | −130 dbm | −80 dbm |
| UE B2 | −80 dbm | −75 dbm |
| UE B3 | −160 dbm | −80 dbm |
| UE B4 | −85 dbm | −125 dbm |
| UE B5 | −70 dbm | −120 dbm |
| UE B6 | −80 dbm | −130 dbm |

After the two P3 sweeps are performed, TRP 794 informs UE 702 about an upcoming PDSCH transmission by transmitting a DCI message pointing (directly or indirectly) to two TCI states, where one TCI state has a spatially quasi co-located (QCL) RS corresponding to the CSI-RS used in P3_1 (i.e., the TCI states corresponds to TRP B1) and the second TCI state has a spatially QCL RS corresponding to the CSI-RS used in P3_2 (i.e., corresponding to TRP B2). In the conventional case, UE 702 would select UE RX beams UE B5 for UE panel 721 and UE B2 for UE panel 722 for the upcoming PDSCH transmission, since they have the highest RSRPs. However, since UE B2 experiences high received power also from TRP B1, the inter-stream interference will be severe for UE B2, which will have a negative impact on the throughput. As can be seen, the TRP B2 only has 5 dB higher RSRP than TRP B1 for UE B2, which means that the resulting SINR in this case for the stream received in UE B2 will at maximum be 5 dB, which might significantly reduce the data rate the stream can convey.

To overcome this problem, UE 702 stores all the RSRP values for each UE RX beam for each TCI state associated with a P3 beam sweep. That is, for example, the UE 702 stores the information in the table shown above. Accordingly, when the TRP indicates PDSCH transmission for the two TCI states corresponding to TRP B1 and TRP B2, the UE will select a UE RX beam pair (i.e., on beam per UE panel) not only based on received RSRP from one of the TCI states, but also consider the difference in RSRP between the two TCI states, since otherwise there is a risk that the inter-stream interference will degrade the user throughput.

For example, in one embodiment the UE calculates a throughput value (e.g., an estimated SINR) based on the RSRPs for TRP B1 and TRP B2 and the noise for each UE RX beam group. In the example UE 702 of FIG. 7, there are 9 UE RX beam groups (UE B1 & UE B4, UE B1 & UE B5, UE B1 & UE B6, UE B2 & UE B4, UE B2 & UE B5, UE B2 & UE B6, UE B3 & UE B4, UE B3 & UE B5, UE B3 & UE B6) because the UE has two panels 721 and 722 and three beams per-panel. Also each group is a pair because the UE has only two panels. If the UE had three panels and three UE beams per panel, then there would be 3×3×3=27 groups of three beams. In one embodiment, the throughput value is a rough estimate since it is only based on power values, however, it will still give a better indication of a suitable UE RX beam combination compared to conventional methods. UE 702 uses the calculated throughput values to select the best beam group—i.e., the beam group (e.g. beam pair) that produced the highest throughput value.

There are a variety of ways for the UE to calculate the throughput value for a UE beam group. In one example, for each UE beam group, the UE computes at least one total throughput value (T) based on a throughput value calculated for each UE beam in the group. For example, assuming the UE beam group consists of two beams (B1 and B2), then, in one embodiment, $T=T\_B1+T\_B2$, where $T\_B1$ is a throughput value for B1 and $T\_B2$ is a throughput value for B2.

In one embodiment, $T\_Bi$ (i=1 or i=2) is a function of: i) a first power value (e.g., an RSRP value) associated with a reference signal transmitted using a first TRP TX beam (denoted TRP_B1) and received using beam Bi (this first power value is denoted P_TRP_B1_UE_Bi), and ii) a second power value associated with a reference signal transmitted using a second TRP TX beam (denoted TRP_B2) and received using beam Bi (this second power value is denoted P_TRP_B2_UE_Bi). For example, $T\_Bi=10*\log 2(P\_TRP\_B2\_UE\_Bi-P\_TRP\_B1\_UE\_Bi-N)$, or $T\_Bi=10*\log 2(P\_TRP\_B1\_UE\_Bi-P\_TRP\_B2\_UE\_Bi-N)$, wherein N is noise value. As the equations for $T\_Bi$ illustrate, with respect to beam Bi, the signal transmitted by the first TRP TX beam is considered as a signal to be received, and the signal transmitted by the second TRP TX beam is considered as interference, or vice-versa.

Using beam UE B1 and UE B4 and the values in the table above as a concrete example, $P\_TRP\_B1\_UE\_B1=-130$; $P\_TRP\_B2\_UE\_B1=-80$; $P\_TRP\_B1\_UE\_B4=-85$; $P\_TRP\_B2\_UE\_B4=-125$; and one value of T for this beam pair is: $10*\log 2(-80-(-130))+10*\log 2(-85-(-125))$; and another value of T for this beam pair is: $10*\log 2(-130-(-80))+10*\log 2(-125-(-85))$. In this example shown, N was set to 0.

Figure 8:
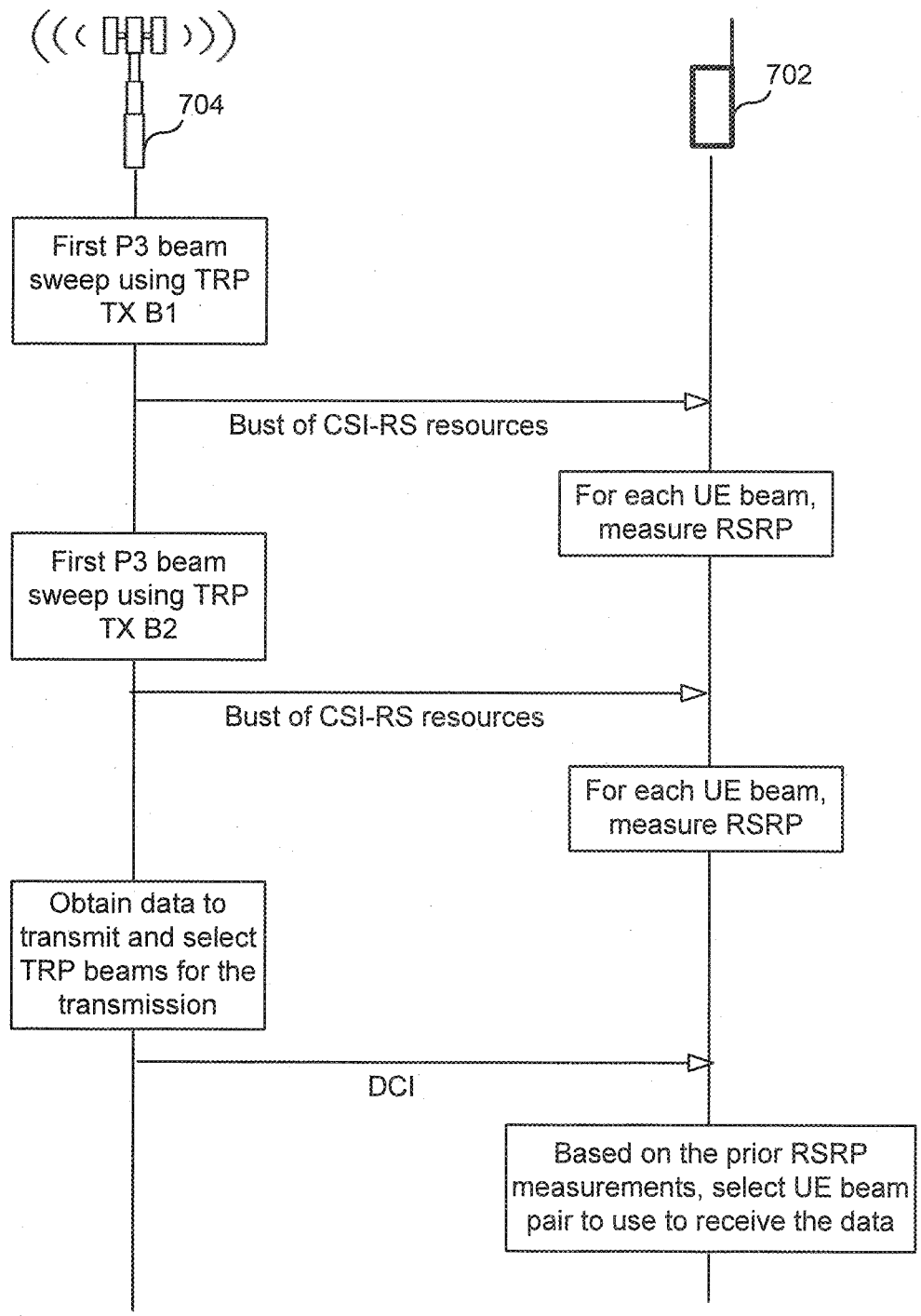
FIG. 8 is a message flow diagram illustrating a process according to an embodiment.

FIG. 8 illustrates a message flow and processing steps according to an embodiment. In the first step, the TRP performs a first P3 beam sweep using a first TRP TX beam. This P3 sweep is associated with a first TCI state. That is, the first P3 beam sweep uses a CSI-RS resource that is used as a source RS for spatial QCL for the first TCI state. The UE then, for each UE panel, sweeps through the different UE RX beams, thereby producing an RSRP measurement for each UE beam and then stores these RSRP values so that they are associated with the first TCI state (TCI_State_1). This is illustrated in the table above.

In the next step, the TRP performs a second P3 beam sweep for a second TRP TX beam. The P3 beam sweep uses a CSI-RS resource that is used as a source RS for spatial QCL for a second TCI state. The UE again sweeps through different UE RX beams for each UE panel and stores the RSRP for each case so that they are associated with the second TCI state. That is, the UE may produce a data structure like the table shown above.

In the next step the TRP schedules a PDSCH transmission and transmits for the UE a DCI that points (directly or indirectly) to the first and second TCI states. The UE will then determine a suitable UE beam pair (i.e., a suitable UE RX beam for each respective UE panel 721, 722) by taking the RSRP values for each TCI state in to account. One way to do this is, as described above, for each UE panel, consider the RSRP associated with the weaker TCI state as inter-stream interference in the UE Rx beam associated with the strongest TCI state. In this way, the UE can evaluate an estimated throughput value (e.g., SINR) for each UE RX beam pair, and then select the UE RX beam pair that would maximize the user throughput. This UE RX beam pair will include: a UE RX beam for the first panel that corresponds to the one of the TCI states and a UE RX beam for the second panel that corresponds to the other TCI state. That is, a first TRP TX beam is associated with a first UE RX beam of one of the UE panels and a second TRP TX beam is associated with a second UE RX beam of the other panel, thereby enabling rank>1 spatial multiplexing—i.e., a first block of data can be transmitted using the first TRP TX, which is mostly received using the first UE RX beam, and a second different block of data can be transmitted using the second TRP TX beam, which is mostly received using the second UE RX beam. Accordingly, with respect to the first UE RX beam, the transmission of the second data block appears as interference, and, with respect to the second UE RX beam, the transmission of the first data block appears as interference.

Figure 9:
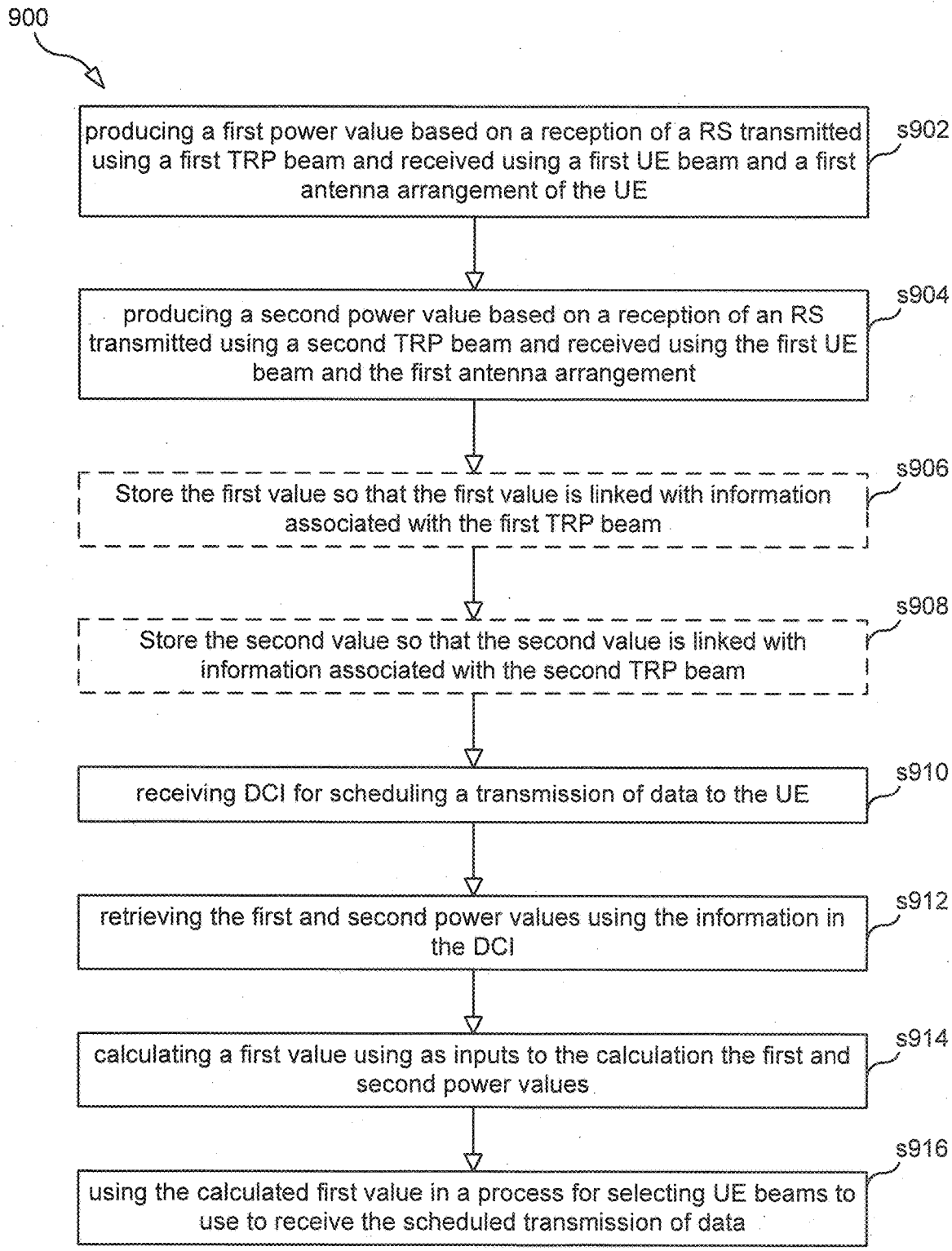
FIG. 9 is a flowchart illustrating a process according to an embodiment.

FIG. 9 is a flowchart illustrating a process 900 according to an embodiment. Process 900 may begin with step s902.

Step s902 comprises UE 702 producing a first power value (e.g., RSRP) based on UE 702 receiving an RS (e.g., a CSI-RS) that was transmitted using a first TRP beam (e.g., TRP_B1) and received using a first UE beam (UE B1) and a first antenna arrangement (e.g., panel 721). This first power value may be denoted: P_TRP_B1_UE_B1.

Step s904 comprises UE 702 producing a second power value based on UE 702 receiving an RS that was transmitted using a second TRP beam (e.g., TRP_B2) and received using the first UE beam and the first antenna arrangement. This second power value may be denoted: P_TRP_B2_UE_B1.

In some embodiments, after performing step s902, UE 702 performs step s906 and after performing step s904, UE 702 performs step s908. Step s906 comprises UE 702 storing the first power value so that the first power value is linked with information (e.g., a first TCI) associated with the first TRP beam, and step s908 comprises UE 702 storing the second power value so that the second power value is linked with information (e.g., a second TCI) associated with the second TRP beam.

Step s910 comprises UE 702 receiving downlink control information (DCI) for scheduling a transmission of data to the UE, the DCI comprising information (e.g., the first TCI and the second TCI) with which the first and second power values are associated (directly or indirectly).

Step s912 comprises UE 702 retrieving the first and second power values using the information in the DCI.

Step s914 comprises UE 702 calculating a first value using as inputs to the calculation the first and second power values. For example, UE 702 calculates: $T\_B1=10*\log 2(P\_TRP\_B2\_UE\_B1-P\_TRP\_B1\_UE\_B1-N)$, and/or UE 702 calculates $T\_B1=10*\log 2(P\_TRP\_B1\_UE\_B1-P\_TRP\_B2\_UE\_B1-N)$, wherein N is noise value, P_TRP_B1_UE_B1 is the first power value and P_TRP_B2_UE_B1 is the second power value.

Step s916 comprises UE 702 using the calculated first value in a process for selecting UE beams to use to receive the scheduled transmission of data. For example, UE 702 may use TB_1 to calculate a first throughput value TP1, where $TP1=T\_B1+T\_B2$, and then compare TP1 to other calculated throughput values to determine the beam pair that produced the highest throughput value, as described above.

Figure 10:
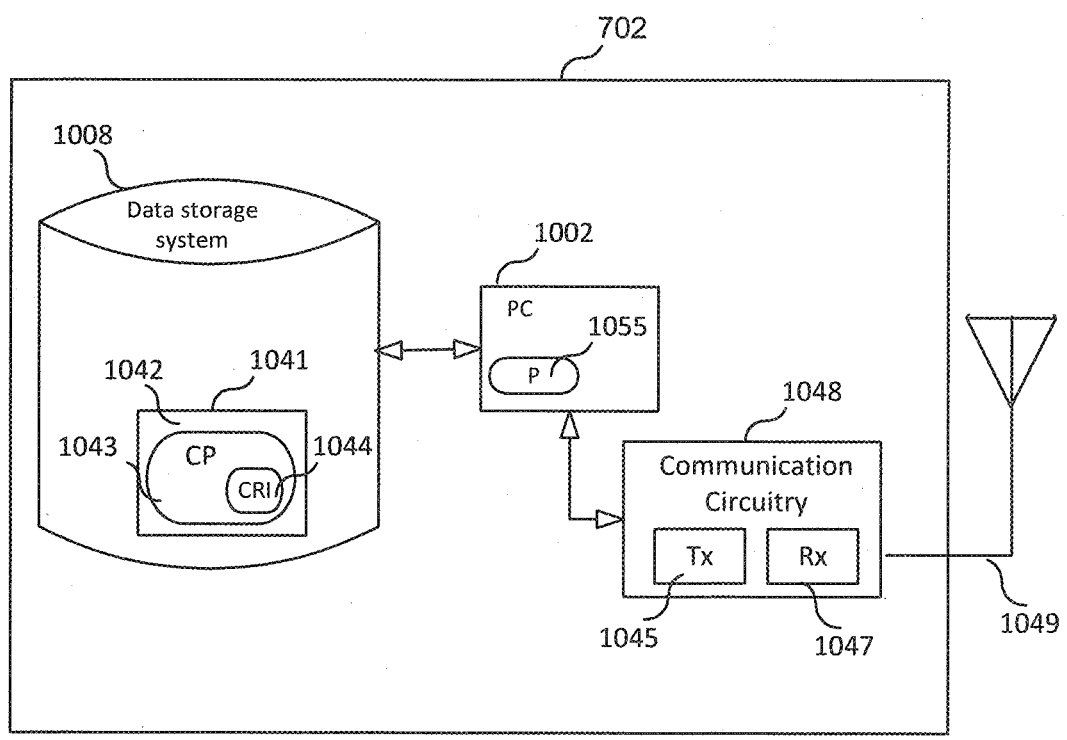
FIG. 10 is a block diagram of a UE according to an embodiment.

FIG. 10 is a block diagram of UE 702, according to some embodiments. As shown in FIG. 10, UE 702 may comprise: processing circuitry (PC) 702, which may include one or more processors (P) 1055 (e.g., one or more general purpose microprocessors and/or one or more other processors, such as an application specific integrated circuit (ASIC), field-programmable gate arrays (FPGAs), and the like); communication circuitry 1048, which is coupled to an antenna arrangement 1049 that comprises one or more antennas (e.g., comprising antenna panel 721 and antenna panel 722) and which comprises a transmitter (Tx) 1045 and a receiver (Rx) 1047 for enabling UE 702 to transmit data and receive data (e.g., wirelessly transmit/receive data); and a local storage unit (a.k.a., "data storage system") 1008, which may include one or more non-volatile storage devices and/or one or more volatile storage devices. In embodiments where PC 702 includes a programmable processor, a computer program product (CPP) 1041 may be provided. CPP 1041 includes a computer readable medium (CRM) 1042 storing a computer program (CP) 1043 comprising computer readable instructions (CRI) 1044. CRM 1042 may be a non-transitory computer readable medium, such as, magnetic media (e.g., a hard disk), optical media, memory devices (e.g., random access memory, flash memory), and the like. In some embodiments, the CRI 1044 of computer program 1043 is configured such that when executed by PC 702, the CRI causes UE 702 to perform steps described herein (e.g., steps described herein with reference to the flow charts). In other embodiments, UE 702 may be configured to perform steps described herein without the need for code. That is, for example, PC 702 may consist merely of one or more ASICs. Hence, the features of the embodiments described herein may be implemented in hardware and/or software.

Figure 11:
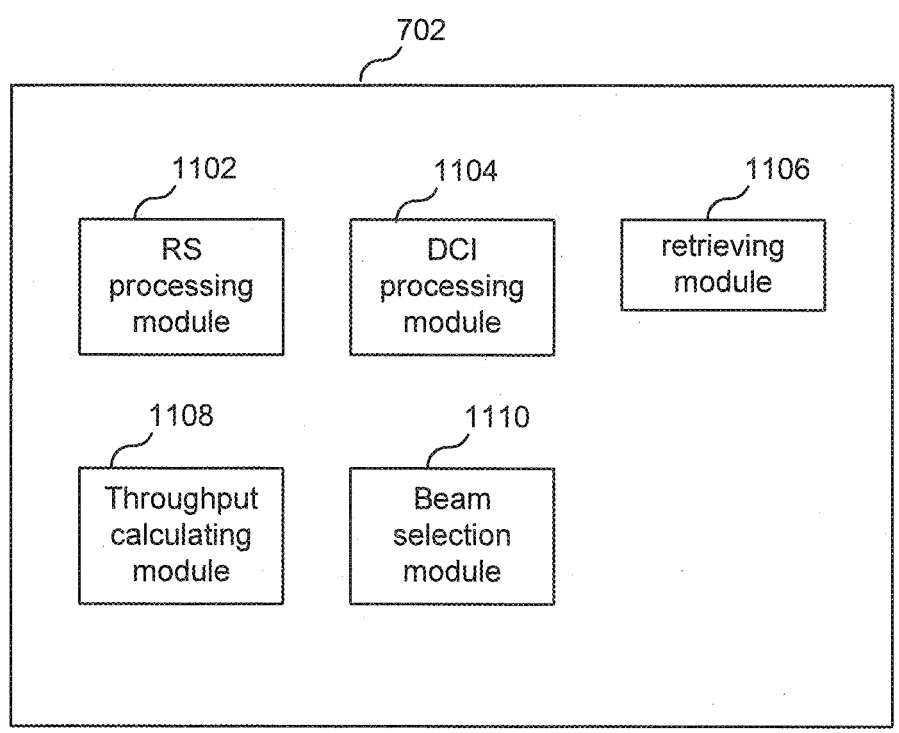
FIG. 11 is a modular block diagram of the UE according to an embodiment.

FIG. 11 is a schematic block diagram of UE 702 according to some other embodiments. UE 702 in some embodiments includes one or more modules, each of which is implemented in software. The module(s) provide the functionality described herein (e.g., the steps herein, e.g., with respect to FIG. 7). In one embodiment, the modules include: an RS processing module 1102 adapted to produce a first power value based on a reception of a reference signal (RS) transmitted using a first TRP beam and received using a first UE beam and a first antenna arrangement of the UE and produce a second power value based on a reception of an RS transmitted using a second TRP beam and received using the first UE beam and the first antenna arrangement; a DCI processing module 1104 adapted to receive and process downlink control information (DCI) for scheduling a transmission of data to the UE, the DCI comprising information (e.g., TCIs) with which the first and second power values are associated; a retrieving module 1106 adapted to retrieve the first and second power values using the information in the received DCI; a throughput calculating module 1108 adapted to calculate a first value using as inputs to the calculation the first and second power values; and a beam selection module 1110 adapted to use the calculated first value in a process for selecting UE beams to use to receive the scheduled transmission of data.

Figure 12:
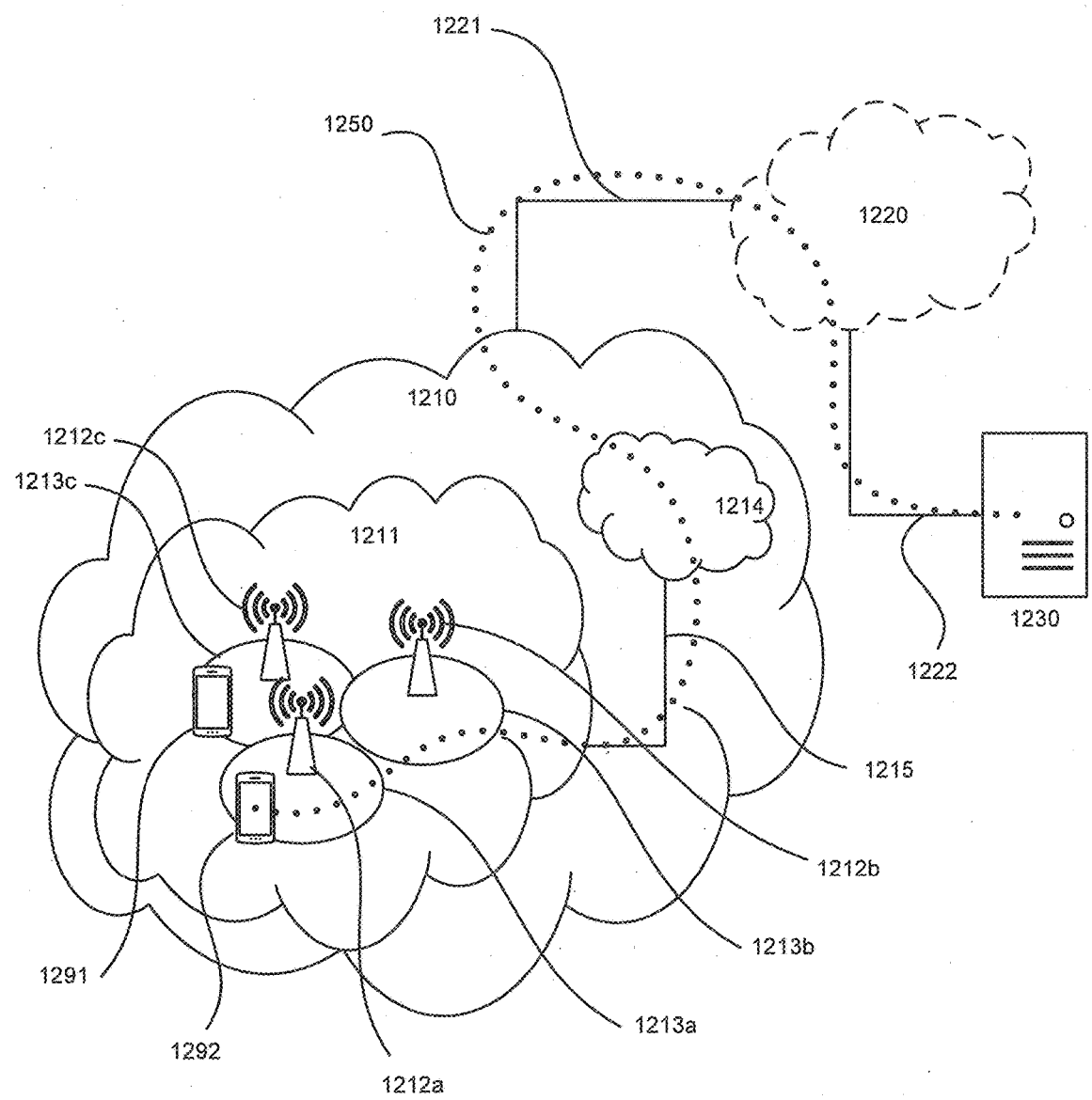
FIG. 12 schematically illustrates a telecommunication network connected via an intermediate network to a host computer.

FIG. 12 illustrates a telecommunication network connected via an intermediate network to a host computer in accordance with some embodiments. With reference to FIG. 12, in accordance with an embodiment, a communication system includes telecommunication network 1210, such as a 3GPP-type cellular network, which comprises access network 1211, such as a radio access network, and core network 1214. Access network 1211 comprises a plurality of APs (hereafter base stations) 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to core network 1214 over a wired or wireless connection 1215. A first UE 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider, or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Example implementations, in accordance with an embodiment, of the UE, base station and host computer discussed in the preceding paragraphs will now be described with reference to FIG. 13, which illustrates a host computer communicating via a base station with a user equipment over a partially wireless connection in accordance with some embodiments. In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 13) served by base station 1320. Communication interface 1326 may be configured to facilitate connection 1360 to host computer 1310. Connection 1360 may be direct or it may pass through a core network (not shown in FIG. 13) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

Figure 13:
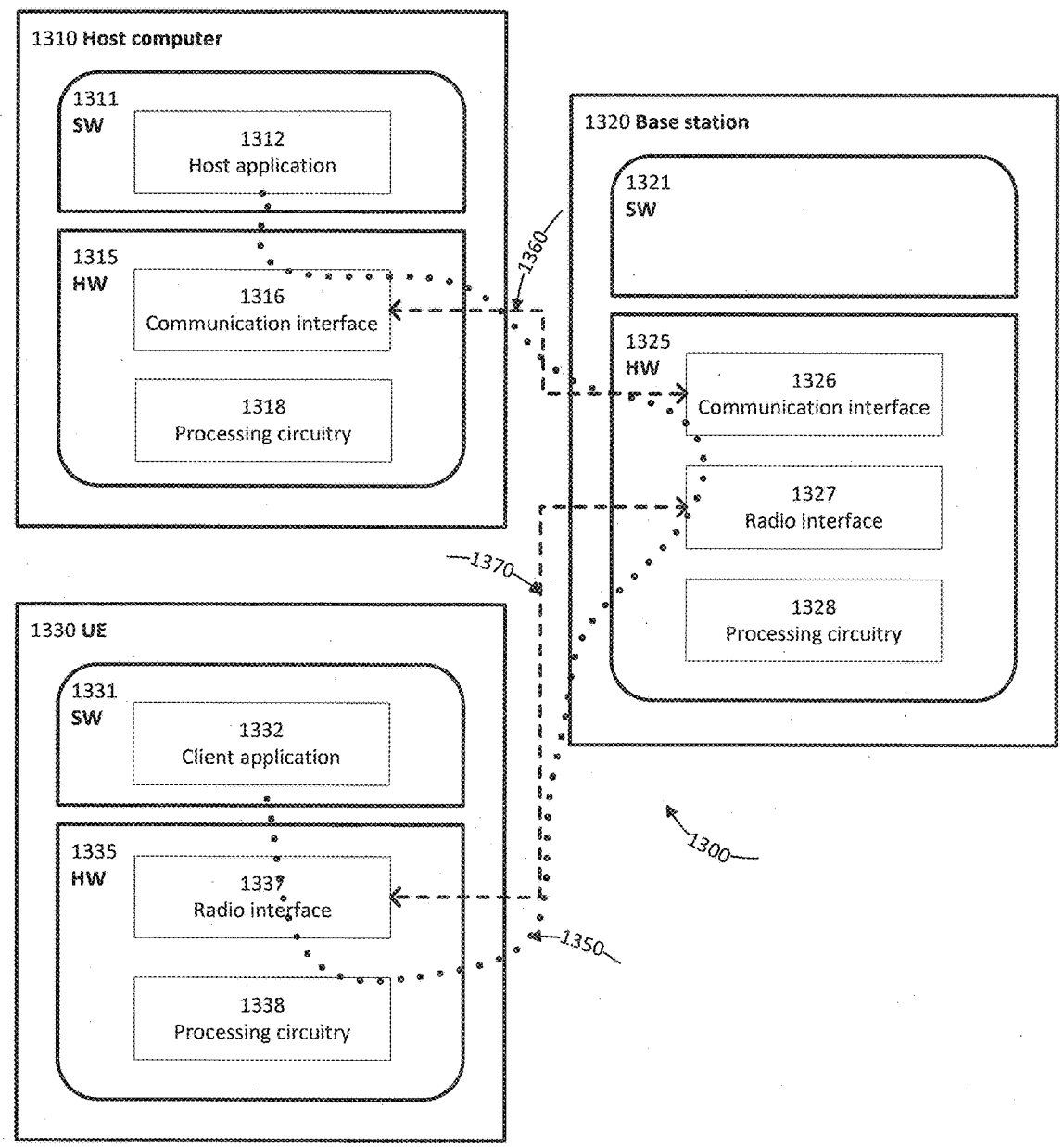
FIG. 13 is a generalized block diagram of a host computer communicating via a base station with a user equipment over a partially wireless connection.

It is noted that host computer 1310, base station 1320 and UE 1330 illustrated in FIG. 13 may be similar or identical to host computer 1230, one of base stations 1212a, 1212b, 1212c and one of UEs 1291, 1292 of FIG. 12, respectively. This is to say, the inner workings of these entities may be as shown in FIG. 13 and independently, the surrounding network topology may be that of FIG. 12.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the teachings of these embodiments may improve one or more of the data rate, latency, block error ratio (BLER), overhead, and power consumption and thereby provide benefits such as reduced user waiting time, better responsiveness, extended battery lifetime, etc.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

Figure 14:
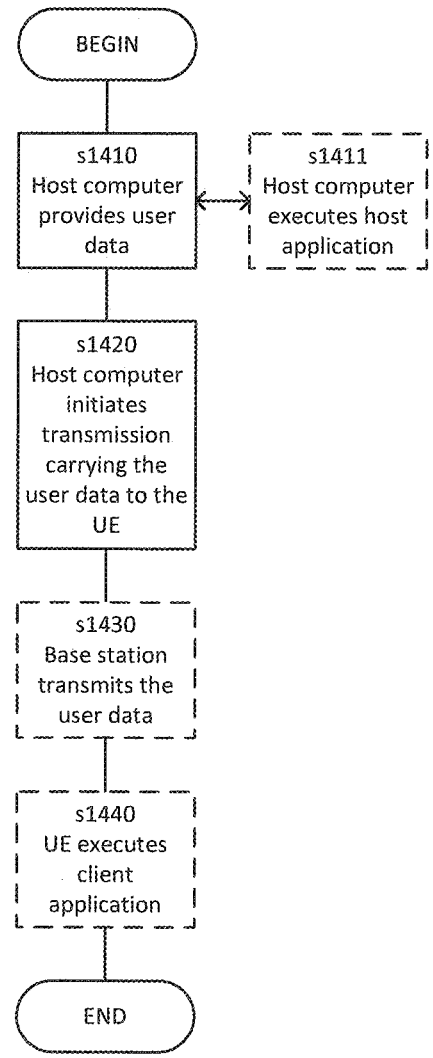
FIG. 14 is a flowchart illustrating a method implemented in a communication system including a host computer, a base station and a user equipment.

FIG. 14 is a flowchart illustrating a method implemented in a communication system, in accordance with one embodiment. The communication system includes a host computer, a base station and a UE which may be those described with reference to FIG. 12 and FIG. 13. In step S1410, the host computer provides user data. In substep S1411 (which may be optional) of step S1410, the host computer provides the user data by executing a host application. In step S1420, the host computer initiates a transmission carrying the user data to the UE. In step S1430 (which may be optional), the base station transmits to the UE the user data which was carried in the transmission that the host computer initiated, in accordance with the teachings of the embodiments described throughout this disclosure. In step S1440 (which may also be optional), the UE executes a client application associated with the host application executed by the host computer.

Figure 15:
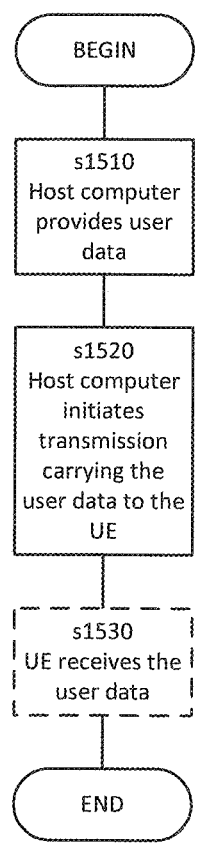
FIG. 15 is a flowchart illustrating a method implemented in a communication system including a host computer, a base station and a user equipment.

FIG. 15 is a flowchart illustrating a method implemented in a communication system, in accordance with one embodiment. The communication system includes a host computer, a base station and a UE which may be those described with reference to FIG. 12 and FIG. 13. For simplicity of the present disclosure, only drawing references to FIG. 15 will be included in this section. In step S1510 of the method, the host computer provides user data. In an optional substep (not shown) the host computer provides the user data by executing a host application. In step S1520, the host computer initiates a transmission carrying the user data to the UE. The transmission may pass via the base station, in accordance with the teachings of the embodiments described throughout this disclosure. In step S1530 (which may be optional), the UE receives the user data carried in the transmission.

Figure 16:
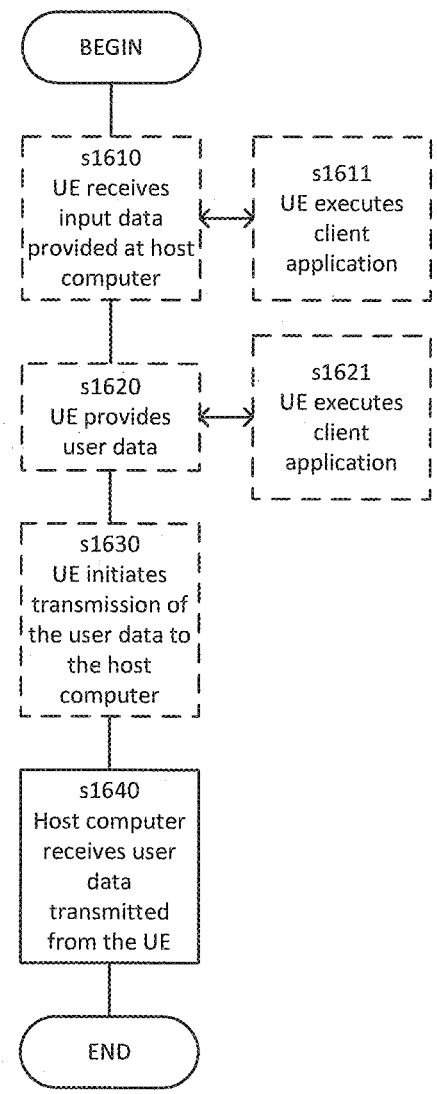
FIG. 16 is a flowchart illustrating a method implemented in a communication system including a host computer, a base station and a user equipment.

FIG. 16 is a flowchart illustrating a method implemented in a communication system, in accordance with one embodiment. The communication system includes a host computer, a base station and a UE which may be those described with reference to FIG. 12 and FIG. 13. For simplicity of the present disclosure, only drawing references to FIG. 16 will be included in this section. In step S1610 (which may be optional), the UE receives input data provided by the host computer. Additionally or alternatively, in step S1620, the UE provides user data. In substep S1621 (which may be optional) of step S1620, the UE provides the user data by executing a client application. In substep S1611 (which may be optional) of step S1610, the UE executes a client application which provides the user data in reaction to the received input data provided by the host computer. In providing the user data, the executed client application may further consider user input received from the user. Regardless of the specific manner in which the user data was provided, the UE initiates, in substep S1630 (which may be optional), transmission of the user data to the host computer. In step S1640 of the method, the host computer receives the user data transmitted from the UE, in accordance with the teachings of the embodiments described throughout this disclosure.

Figure 17:
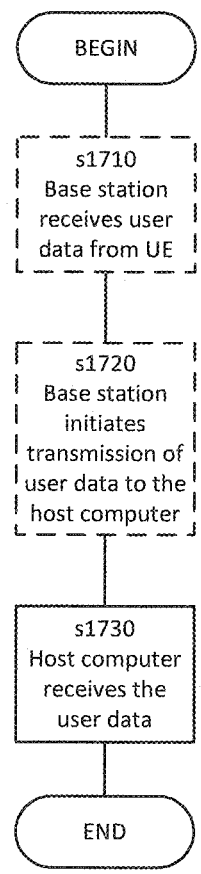
FIG. 17 is a flowchart illustrating a method implemented in a communication system including a host computer, a base station and a user equipment.

FIG. 17 is a flowchart illustrating a method implemented in a communication system, in accordance with one embodiment. The communication system includes a host computer, a base station and a UE which may be those described with reference to FIG. 12 and FIG. 13. For simplicity of the present disclosure, only drawing references to FIG. 17 will be included in this section. In step S1710 (which may be optional), in accordance with the teachings of the embodiments described throughout this disclosure, the base station receives user data from the UE. In step S1720 (which may be optional), the base station initiates transmission of the received user data to the host computer. In step S1730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While various embodiments of the present disclosure are described herein, it should be understood that they have been presented by way of example only, and not limitation. Thus, the breadth and scope of the present disclosure should not be limited by any of the above-described exemplary embodiments. Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. Any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel. That is, the steps of any methods disclosed herein do not have to be performed in the exact order disclosed, unless a step is explicitly described as following or preceding another step and/or where it is implicit that a step must follow or precede another step.

The invention claimed is:

1. A method performed by a user equipment (UE), the method comprising:
producing a first power value based on a reception of a reference signal (RS) transmitted using a first TRP beam and received using a first UE beam and a first antenna arrangement of the UE;
producing a second power value based on a reception of an RS transmitted using a second TRP beam and received using the first UE beam and the first antenna arrangement;
receiving downlink control information (DCI) for scheduling a transmission of data to the UE, the DCI comprising information with which the first and second power values are associated;
after receiving the DCI, retrieving the first and second power values using the information in the DCI;
calculating a first value using as inputs to the calculation the first and second power values; and
using the calculated first value in a process for selecting UE beams to use to receive the scheduled transmission of data.

2. The method of claim 1, wherein
the RS that was transmitted using the first TX beam is one of a burst of RSs transmitted to the UE using the first TX beam as part of a beam management procedure, and
the RS that was transmitted using the second TX beam is one of a burst of RSs transmitted to the UE using the second TX beam as part of said beam management procedure.

3. The method of claim 1, further comprising, prior to receiving the DCI, performing the steps of:
producing a third power value based on a reception of a RS transmitted using the first TRP beam and received using a second UE beam and a second antenna arrangement of the UE; and producing a fourth power value based on a reception of an RS transmitted using the second TRP beam and received using the second UE beam and the second antenna arrangement.

4. The method of claim 3, further comprising, after receiving the DCI, performing the further steps of:
retrieving the third and fourth power values using the information in the DCI;
calculating a second value using as inputs to the calculation the third and fourth power values; and
using the calculated first and second values in the process for selecting UE beams to use to receive the scheduled transmission of data.

5. The method of claim 4, wherein using the calculated first and second values in the process for selecting UE beams to use to receive the scheduled transmission of data comprises calculating a first throughput value (TP1), were $$TP1=T1+T2,$$

T1 is the first calculated value,
T2 is the second calculated value,
T1 is a function of a difference between the first power value and the second power value, and
T2 is a function of a difference between the third power value and the fourth power value.

6. The method of claim 5, wherein $$T1=10*\log 2(P\_TRP\_B2\_UE\_B1-P\_TRP\_B1\_UE\_B1-N),$$

$$T2=10*\log 2(P\_TRP\_B1\_UE\_B2-P\_TRP\_B2\_UE\_B2-N),$$

P_TRP_B1_UE_B1 is the first power value,
P_TRP_B2_UE_B1 is the second power value,
P_TRP_B1_UE_B2 is the third power value,
P_TRP_B2_UE_B2 is the fourth power value, and
N is a noise value.

7. The method of claim 4, further comprising, prior to receiving the DCI, performing the steps of:
producing a fifth power value based on a reception of a RS transmitted using the first TRP beam and received using a third UE beam and the first antenna arrangement of the UE; and
producing a sixth power value based on a reception of an RS transmitted using the second TRP beam and received using the third UE beam and the first antenna arrangement.

8. The method of claim 7, further comprising, after receiving the DCI, performing the further steps of:
retrieving the fifth and sixth power values using the information in the DCI;
calculating a third value using as inputs to the calculation the fifth and sixth power values; and
using the calculated first, second, and third values in the process for selecting UE beams to use to receive the scheduled transmission of data.

9. The method of claim 8, wherein using the calculated first, second, and third values in the process for selecting UE beams to use to receive the scheduled transmission of data comprises:
calculating a first throughput value (TP1), where TP1=T1+T2;
calculating a second throughput value (TP2), where TP2=T3+T2;
determining whether TP1 is larger than TP2; and
as a result of determining that TP1 is larger than TP2, selecting the first beam and the second beam to receive the scheduled transmission of data, wherein T1 is the first calculated value,
T2 is the second calculated value, and
T3 is the third calculated value.

10. The method of claim 9, wherein
T1 is a function of a difference between the first power value and the second power value,
T2 is a function of a difference between the third power value and the fourth power value, and
T3 is a function of a difference between the fifth power value and the sixth power value.

11. The method of claim 1, further comprising:
storing the first power value so that the first power value is associated with information associated with the first TRP beam; and
storing the second power value so that the second power value is associated with information associated with the second TRP beam.

12. The method of claim 1, wherein the RS signal transmitted using the second TRP beam is transmitted from the same TRP that transmits the RS signal transmitted using the first TRP beam.

13. A computer program product comprising a non-transitory computer readable medium storing instructions which when performed by processing circuitry of a user equipment (UE) causes the UE to perform the method of claim 1.

14. A user equipment (UE), the UE being adapted to:
produce a first power value based on a reception of a reference signal (RS) transmitted using a first TRP beam and received using a first UE beam and a first antenna arrangement of the UE;
produce a second power value based on a reception of an RS transmitted using a second TRP beam and received using the first UE beam and the first antenna arrangement;
receive downlink control information (DCI) for scheduling a transmission of data to the UE, the DCI comprising information with which the first and second power values are associated;
after receiving the DCI, retrieve the first and second power values using the information in the DCI;
calculate a first value using as inputs to the calculation the first and second power values; and
use the calculated first value in a process for selecting UE beams to use to receive the scheduled transmission of data.

15. The UE of claim 14, wherein
the RS that was transmitted using the first TX beam is one of a burst of RSs transmitted to the UE using the first TX beam as part of a beam management procedure, and
the RS that was transmitted using the second TX beam is one of a burst of RSs transmitted to the UE using the second TX beam as part of said beam management procedure.

16. The UE of claim 14, wherein the UE is further adapted to:
prior to receiving the DCI, produce a third power value based on a reception of a RS transmitted using the first TRP beam and received using a second UE beam and a second antenna arrangement of the UE;
prior to receiving the DCI, produce a fourth power value based on a reception of an RS transmitted using the second TRP beam and received using the second UE beam and the second antenna arrangement;
after receiving the DCI, perform the steps of:
retrieving the third and fourth power values using the information in the DCI;

calculating a second value using as inputs to the calculation the third and fourth power values; and using the calculated first and second values in the process for selecting UE beams to use to receive the scheduled transmission of data.

17. The UE of claim 16, wherein using the calculated first and second values in the process for selecting UE beams to use to receive the scheduled transmission of data comprises calculating a first throughput value (TP1), wherein $TP1=T1+T2$, T1 is the first calculated value,
T2 is the second calculated value,
T1 is a function of a difference between the first power value and the second power value, and
T2 is a function of a difference between the third power value and the fourth power value.

18. The UE of claim 16, wherein the UE is further adapted to:
prior to receiving the DCI, produce a fifth power value based on a reception of a RS transmitted using the first TRP beam and received using a third UE beam and the first antenna arrangement of the UE; and
prior to receiving the DCI, produce a sixth power value based on a reception of an RS transmitted using the second TRP beam and received using the third UE beam and the first antenna arrangement.

19. The UE of claim 18, wherein the UE is further adapted to:
after receiving the DCI, retrieving the fifth and sixth power values using the information in the DCI;
calculate a third value using as inputs to the calculation the retrieved fifth and sixth power values; and
use the calculated first, second, and third values in the process for selecting UE beams to use to receive the scheduled transmission of data.

20. The UE of claim 19, wherein using the calculated first, second, and third values in the process for selecting UE beams to use to receive the scheduled transmission of data comprises:
calculating a first throughput value (TP1), where TP1=T1+T2;
calculating a second throughput value (TP2), where TP2=T3+T2;
determining whether TP1 is larger than TP2; and
as a result of determining that TP1 is larger than TP2, selecting the first beam and the second beam to receive the scheduled transmission of data, wherein
T1 is the first calculated value,
T2 is the second calculated value, and
T3 is the third calculated value.

21. A method performed by a user equipment (UE), the method comprising:
producing a first power value (P_TRP1_UE1) based on a reception of a reference signal (RS) transmitted using a first TRP beam and received using a first UE receive (RX) beam;
producing a second power value (P_TRP2_UE1) based on a reception of an RS transmitted using a second TRP beam and received using the first UE RX beam;
producing a third power value (P_TRP1_UE2) based on a reception of an RS transmitted using the first TRP beam and received using a second UE RX beam;
producing a fourth power value (P_TRP2_UE2) based on a reception of an RS transmitted using the second TRP beam and received using the second UE RX beam;
receiving downlink control information (DCI) for scheduling a transmission of data to the UE using the first TRP beam and the second TRP beam, the DCI comprising information corresponding to a beam tuple consisting of the first TRP beam and the second TRP beam; and
in response to receiving the DCI: i) obtaining a set of N throughput values, the set of N throughput values comprising: 1) a first throughput value calculated using the first power value and the second power value and 2) a second throughput value calculated using the third power value and the fourth power value; and ii) using the set of N throughput values in a process for selecting a UE RX beam from a set of UE RX beams that includes the first UE RX beam and the second UE RX beam.

22. The method of claim 21, wherein
obtaining a set of N throughput values comprises generating the set of N throughput values, and
generating the set of N throughput values comprises:
i) generating the first throughput value by calculating the first throughput value using the first and second power values as inputs to the calculation; and
i) generating the second throughput value by calculating the second throughput value using the third and fourth power values as inputs to the calculation.

23. The method of claim 22, wherein obtaining a set of N throughput values further comprises, prior to generating the set of N throughput values, using information contained in the DCI to retrieve from a date store the first, second, third, and fourth power values.

* * * * *